April 13, 1943.  N. R. BEAGLE  2,316,548
FASTENING DEVICE
Filed Nov. 21, 1942
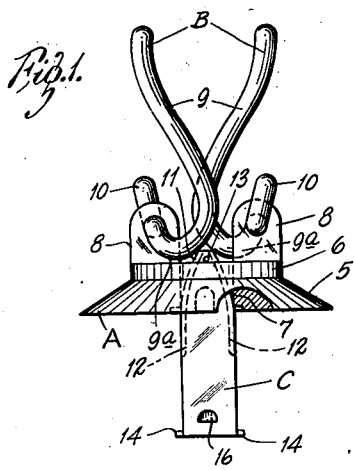
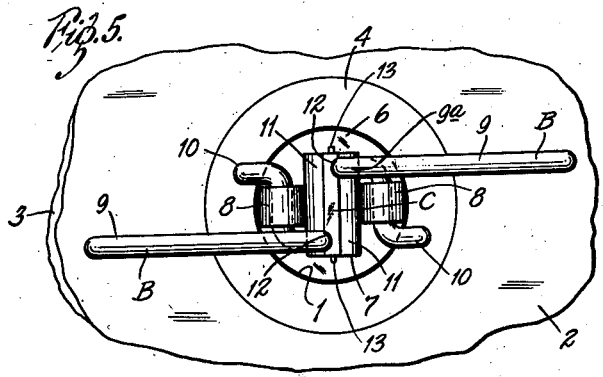
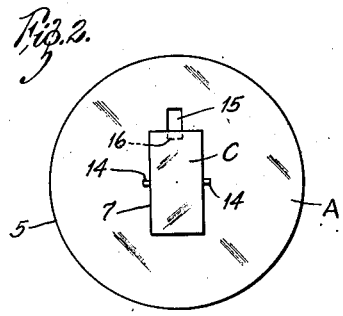
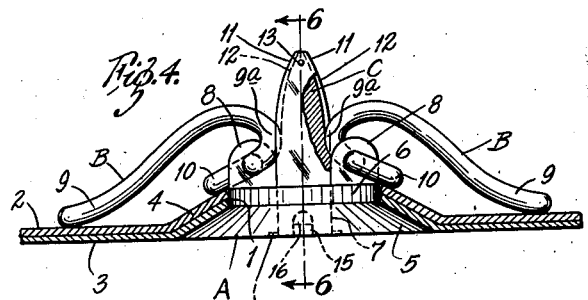
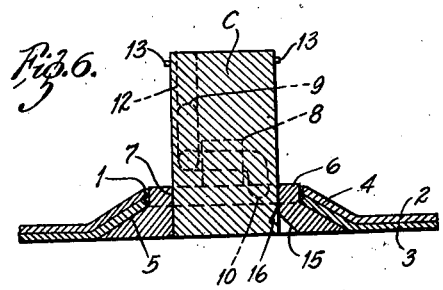
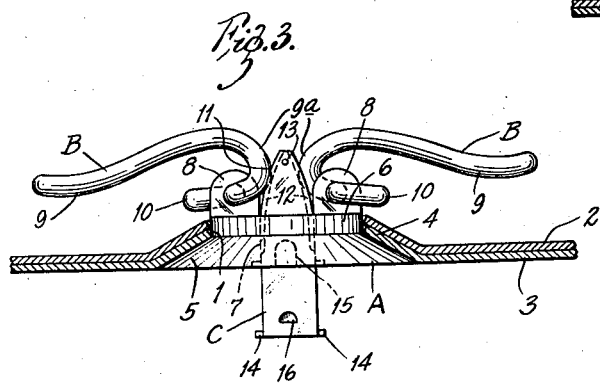
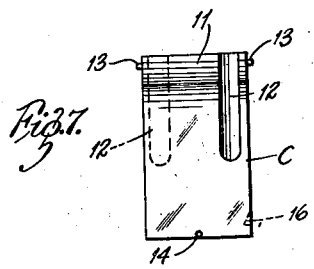
INVENTOR:
Nathaniel R. Beagle
HIS ATTORNEYS.

Patented Apr. 13, 1943

2,316,548

UNITED STATES PATENT OFFICE 2,316,548

FASTENING DEVICE

Nathaniel R. Beagle, Jefferson City, Mo.

Application November 21, 1942, Serial No. 466,511

12 Claims. (Cl. 24—221)

This invention relates to quick attachable and detachable fastening devices of the kind adapted to be passed through a previously formed hole in two or more pieces to be secured together. The invention has for its principal object to provide a simple, compact and efficient fastening device of the above type of strong, durable and economical construction, which will rigidly clamp the parts together and which is readily inserted and removed and quickly and easily locked and unlocked. The invention consists in the fastening device and in the construction, combinations and arrangements of parts hereinafter described.

In the accompanying drawing, which forms part of this specification wherein like symbols refer to like parts wherever they occur, Fig. 1 is a side elevational view of a fastening device embodying my invention, the device being shown in inoperative position, Fig. 2 is a view of the outer end of said fastening device.

Fig. 3 is a view showing the fastening device partially locked and mounted in the opening provided therefor in the two pieces that are to be secured together thereby, said device being shown in side elevation and said pieces in section, Fig. 4 is a view similar to Fig. 3, showing the fastening device in fully locked position, Fig. 5 is a plan view of the parts shown in Fig. 4, Fig. 6 is a central longitudinal section on the line 6—6 in Fig. 4; and Fig. 7 is a side elevational view of the wedge element of the fastening device.

The fastening device shown in the accompanying drawing is designed to be passed through a circular hole 1 provided therefor in two or more sheet or plate members 2 and 3 to secure them together. The fastening device comprises a plug or bolt member A that snugly fits the opening 1 in the sheets 2 and 3. As shown in the drawing, the two sheets 2 and 3 are pressed inwardly around the opening 1 to form a countersink 4 at the mouth or plug entering end of said hole, while the corresponding end of the plug A is enlarged and shaped after the manner of a truncated cone to form a countersunk head 5 that seats within the countersunk end of said hole. The plug member A terminates inwardly of the countersunk portion 4 of the hole 1 in a cylindrical inner end portion 6 and has a central, preferably rectangular or flat-sided opening 7 extending therethrough from end to end thereof.

Projecting from the cylindrical inner end 6 of the plug member A of the fastening device are two diametrically opposed lugs or ears 8 arranged one on each side of the opening 7 in said plug member. Journaled in openings or bearings provided therefor in the lugs 8 for swinging movement towards and away from each other transversely of the axis of the plug member is a pair of spring locking arms or levers B. Each of these spring levers has a relatively long arm 9 disposed on one side of its supporting lug 8 and a relatively short arm 10 disposed on the other side thereof. The long arm 9 is curved inwardly towards the opening 6 of the plug member A and is thence rebent, as at 9a, away from said opening and beyond said lug, while the short arm extends in the same general direction as said long arm but terminates short thereof. The spring levers B are preferably arranged with a long arm of one lever and the short arm of the other lever on the same side of the supporting lugs 8.

The two spring levers B are forced apart by means of a wedge member that is inserted in the opening 7 through the plug member A and has a snug sliding fit therein. The wedge member C extends inwardly through the opening 7 beyond the cylindrical inner end 6 of the plug member A and between the two lever supporting lugs 8 thereon where its lug opposing side faces converge or taper inwardly towards each other to form a wedge 11 at the inner or entering end of said wedge member. The tapered side faces of the wedge member C have longitudinal grooves 12 therein that form seats for the return bend positions 9a of the long arms 9 of the spring levers B.

The inner end of the wedge member C is provided with laterally projecting pins 13 adapted to abut against the inner face of the cylindrical inner end portion 6 of the plug member A and thus prevent complete withdrawal of said wedge from said plug member; and similar pins 14 are provided at the outer end of said wedge member to limit the inward sliding movement thereof in said plug member. The outer end of the wedge receiving opening 7 in the plug member A has a beveled notch 15 therein; and the wedge member C has a notch 16 formed therein opposite said first mentioned notch, whereby a suitable implement may be inserted in the notch 15 and engaged with the notch 16 to withdraw said wedge from said plug member.

The hereinbefore described fastening device operates as follows: The plug member A is positioned in the hole 1 in the two sheets 2 and 3 that are to be secured together, with the countersunk head of said plug member seated in the countersunk portion of said hole and with the spring locking levers B swung towards each other to clear the sides of said opening. The wedge member C is then forced inwardly in the central opening 7 in the plug member A and the tapered end 11 of said wedge member engages the return-bend portions 9a of the levers B and causes them to swing away from each other until the free ends of the long arms 9 and the short arms 10 of said levers bear resiliently against the innermost sheet 2, the short arms engaging said sheet close to the edge of said opening. In this position of the parts, the two sheets are rigidly clamped together flatwise between the conical outer end portion 5 of the plug member A and the long and short arms of the two resilient locking levers. At the same time, relative sliding movement of the two sheets is prevented by the plug A and the nested bosses that form the countersunk portion of the plug reserving hole 1. When it is desired to remove the fastening device, the wedge member C is pulled outwardly in the hole 1 until the stop pins 13 at the inner end of said member abut against the cylindrical inner end portion 6 of the plug member A, in which position further outward movement of said wedge member pulls said plug member outwardly in the hole 1, whereby the two levers B are swung inwardly towards each other by the pressure of the short arms 10 thereof on the edge of said hole so that said levers will pass therethrough.

Obviously, the hereinbefore described fastening device admits of considerable modification and I do not wish to be limited to the precise construction shown and described. For instance, the parts of the device may be made of any suitable material, the plug may be provided with a plain head instead of a countersunk head and the locking springs may be mounted on said plug in any desired manner.

What I claim is:

1. A fastening device comprising a plug member having a head at one end thereof, a lever pivotally supported on said plug member adjacent to the other end thereof, and a member mounted in said plug member for sliding movement lengthwise thereof into engagement with said lever to swing the same laterally outwardly of said plug member.

2. A fastening device comprising a plug member having a head at one end thereof, a spring arm pivotally supported on said plug member adjacent to the other end thereof and a member mounted for longitudinal sliding but non-rotary movement relative to said plug member, into engagement with said spring arm to swing the same to one side of said plug member.

3. A fastening device comprising a plug member having a countersunk head at one end thereof, a spring arm pivotally supported on said plug member adjacent to the other end thereof and a member mounted in said plug member for longitudinal sliding but non-rotary movement relative thereto, into engagement with said spring arm to swing the same to one side of said plug member.

4. A fastening device comprising a bolt member having a head at one end thereof, a lever pivotally mounted on the other end of said bolt member to swing transversely thereof, said lever having two spring arms extending in the same general direction, and a member mounted in said plug for sliding movement lengthwise thereof into engagement with said lever to swing both arms thereof to one side of said bolt member.

5. A fastening device comprising a bolt member having a head at one end thereof, a lever pivotally mounted on the other end of said bolt member to swing transversely thereof, said lever having two spring arms extending in the same general direction, and a member mounted in said plug for sliding movement lengthwise thereof into engagement with said lever to swing both arms thereof to one side of said bolt member, one of said arms being shorter than the other and being adapted and arranged when said bolt member is withdrawn from an opening therefor to engage the edge of said opening and swing said lever into substantial endwise alinement with said bolt member.

6. A fastening device comprising a bolt member having a head, a pair of levers pivotally supported on said bolt member so as to swing transversely thereof to lock said plug member and to permit its withdrawal, and a wedge member mounted in said plug for sliding movement lengthwise thereof into engagement with said levers for swinging the same away from one another into locking position.

7. A fastening device comprising a plug member having a countersunk head at one end thereof, a pair of spring arms pivotally supported on said plug member adjacent to the other end thereof for swinging movement crosswise of said plug member, and a wedge member mounted in said plug for sliding movement longitudinally thereof into engagement with said levers to swing the same away from each other laterally outwardly of said plug member.

8. A fastening device comprising a plug member having a countersunk head at one end thereof, a pair of spring levers pivotally supported on the other end of said plug member so as to swing transversely thereof to secure said plug member or to permit its withdrawal, said plug member having a flat-sided slideway extending therethrough from end to end thereof, and a flat-sided member slidably supported in said slideway and having a wedge-shaped inner end portion adapted to engage said levers and swing the same away from each other laterally outwardly of said plug member.

9. A fastening device comprising a plug member having a countersunk head and adapted to fit within a countersunk opening provided therefor in two or more pieces that are to be secured together, a pair of levers pivotally supported on said plug member for swinging movement crosswise thereof, and a wedge member mounted in said plug member for sliding movement longitudinally thereof into engagement with said levers to swing the same into engagement with one of said pieces on opposite sides of said opening.

10. A fastening device comprising a plug member having a countersunk head and adapted to fit within a countersunk opening provided therefor in two or more pieces that are to be secured together, a pair of levers pivotally supported on said plug member for swinging movement crosswise thereof, and a wedge member mounted in said plug member for sliding movement longitudinally thereof into engagement with said levers to swing the same into engagement with one of said pieces on opposite sides of said opening, each of said levers comprising a long and a short arm extending in the same general direction.

11. A fastening device comprising a plug member having a countersunk head and adapted to fit within a countersunk opening provided therefor in two or more pieces that are to be secured together, a pair of levers pivotally supported on said plug member for swinging movement crosswise thereof, and a wedge member mounted in said plug member for sliding movement longitudinally thereof into engagement with said levers to swing the same into engagement with one of said pieces on opposite sides of said opening, each of said levers comprising a long and a short arm extending in the same general direction, said short arm being adapted when said plug member is withdrawn from said opening to bear against the edge of said opening and swing said lever into substantial endwise alinement with said plug member.

12. A fastening device comprising a plug member having a countersunk head and adapted to fit within a countersunk opening provided therefor in two or more pieces that are to be secured together, a pair of levers pivotally supported on said plug member for swinging movement crosswise thereof, and a wedge member mounted in said plug member for sliding movement longitudinally thereof into engagement with said levers to swing the same into engagement with one of said pieces on opposite sides of said opening, each of said levers comprising a long and a short arm extending in the same general direction, said short arm being adapted when said plug member is withdrawn from said opening to bear against the edge of said opening and swing said lever into substantial endwise alinement with said plug member, means for retaining said wedge member in said plug member, said plug member and said wedge member having recesses in the outer end thereof adapted to receive a tool for withdrawing said wedge member from said plug member.

NATHANIEL R. BEAGLE.